Nov. 7, 1933.  R. NICEWANDER ET AL  1,933,679
TRACTOR WHEEL SCRAPER
Filed June 18, 1932   3 Sheets-Sheet 2

Inventors
*Roy Nicewander*
*Victor C. Peterson*
By *Clarence A. O'Brien*
Attorney Nov. 7, 1933. R. NICEWANDER ET AL 1,933,679
TRACTOR WHEEL SCRAPER
Filed June 18, 1932 3 Sheets-Sheet 3

Inventors
Roy Nicewander
Victor C. Peterson
By Clarence A. O'Brien
Attorney

Patented Nov. 7, 1933

1,933,679

UNITED STATES PATENT OFFICE 1,933,679

TRACTOR WHEEL SCRAPER

Roy Nicewander and Victor C. Peterson, Loda, Ill.

Application June 18, 1932. Serial No. 618,032

3 Claims. (Cl. 280—158)

This invention relates to a fender attachment for tractors and has more specific reference to a cleaning and scraping device for use in scraping mud and dirt deposits from between the traction lug of a tractor wheel.

It is a matter of common knowledge that so-called spade lug wheels on present-day tractors become clogged with mud when in use and such depositions of material decrease the traction efficiency of the wheels. It has been discovered that by using a simple scraping blade and holding it against the rim of the wheel, the removal of the major portion of the deposited mud is generally sufficient to keep the traction lugs fairly clean and more susceptible of effective work.

We are aware of the fact that attachments of this class are not broadly new. Therefore, the present invention relies for its novelty on a structurally refined and improved attachment wherein the principal novelty resides in the shock absorbing means for the blade, and a unique trip and blade releasing feature which allows the blade to be kicked safely to an out-of-the-way position when it encounters a stubborn stone or rock embedded in the mud on the tread of the wheel whereby to prevent disruption and breakage of the blade.

In the accompanying illustratve drawings:

Figure 2 is an enlarged detailed sectional and elevational view.

Figure 4 is an inverted perspective view of the blade carrier.

Figure 5 is a perspective view of the automatically operable releasing latch for the blade.

Figure 6 is a perspective view of the special scraping blade.

Figure 8:
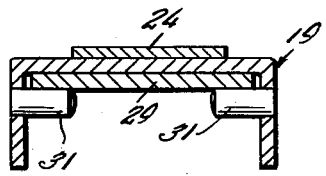
Figure 9:
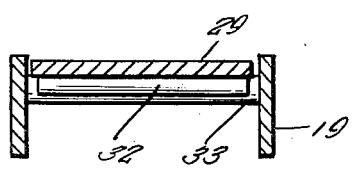

Figures 8 and 9 are transverse sectional views taken approximately on the plane of the line 8—8 and 9—9 respectively of Figure 2.

Figure 1:
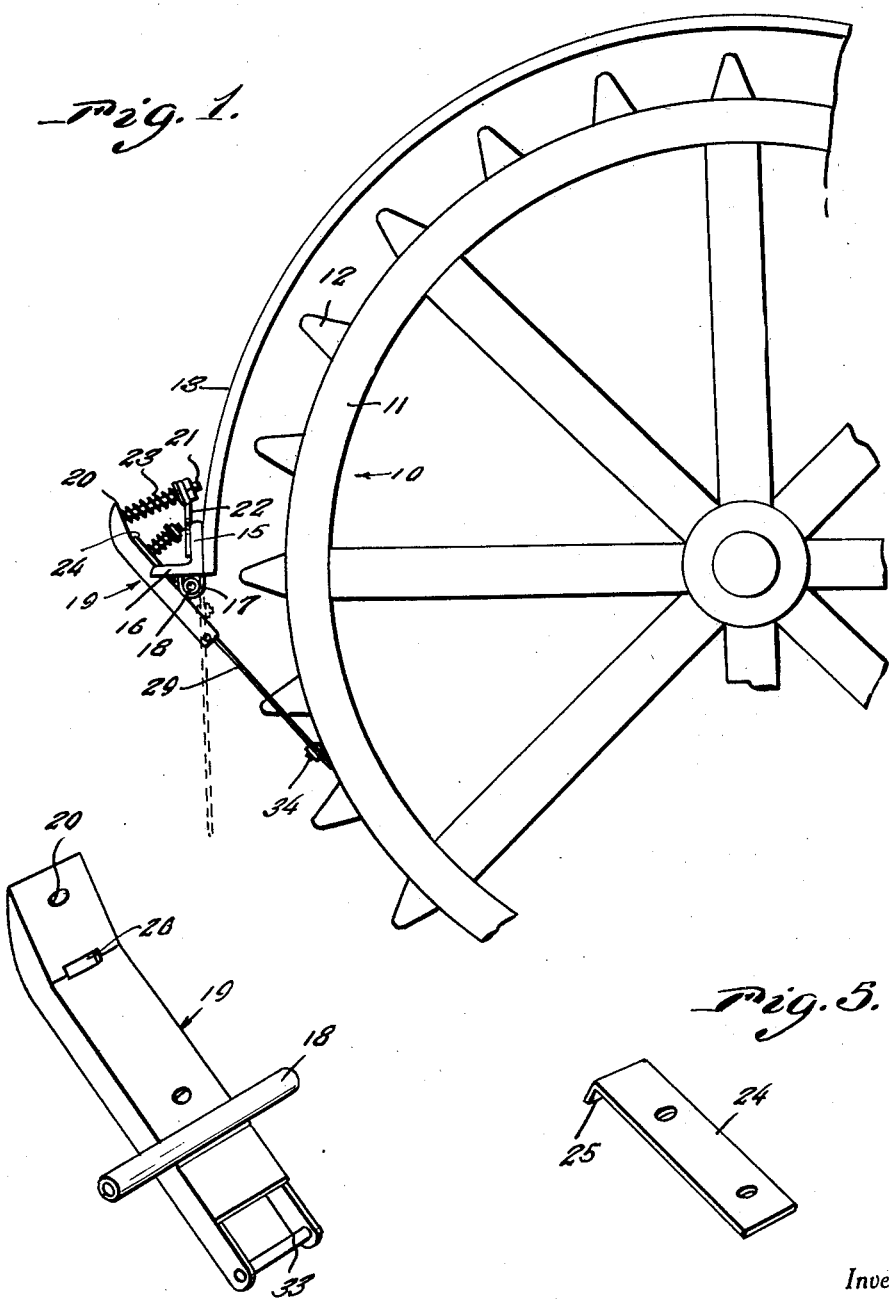
Figure 1 is a side view showing a fragmentary portion of the wheel and fender with the scraping and cleaning attachment in operative position.
Figure 7:
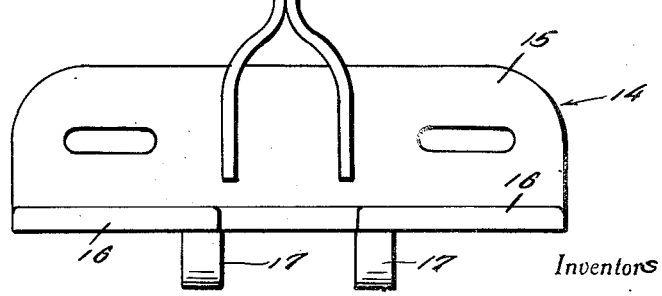
Figure 7 is an elevational view of the fender attaching bracket.

In the drawings, in Figure 1, the conventional traction wheel is denoted by the numeral 10, the tread or rim being distinguished by the numeral 11, and the marginal traction lug being indicated at 12. The fender is represented at 13. The fender bracket is denoted in Figure 7 by the numeral 14 and comprises a slotted attaching flange 15 bolted or otherwise secured to the fender as seen better in Figure 3.

The numerals 16 designate spaced complemental flanges carrying bearings 17, said bearings serving to receive the pintle or pivot pin 18 carried by the elongated channel-shaped blade adapter or carrier 19. The end portion 20 of the adapter is offset and a bolt 21 is attached thereto, the nut equipped end of the bolt extending through a suitable retention element or member 22 carried by the flange 15 of the bracket.

A shock absorbing coil spring 23 surrounds the bolt and allows the spring cushioned rocking action of the carrier in its bearing. The numeral 24 designates a latch having a laterally directed end portion 25 projecting through an aperture 26 in the web portion of the carrier. As seen in Figure 2, the latch is provided with a bolt or pin 27 surrounded by a retaining spring 28, which serves to hold the latch in a position to engage the adjacent end portion of the scraping blade 29.

Figure 3:
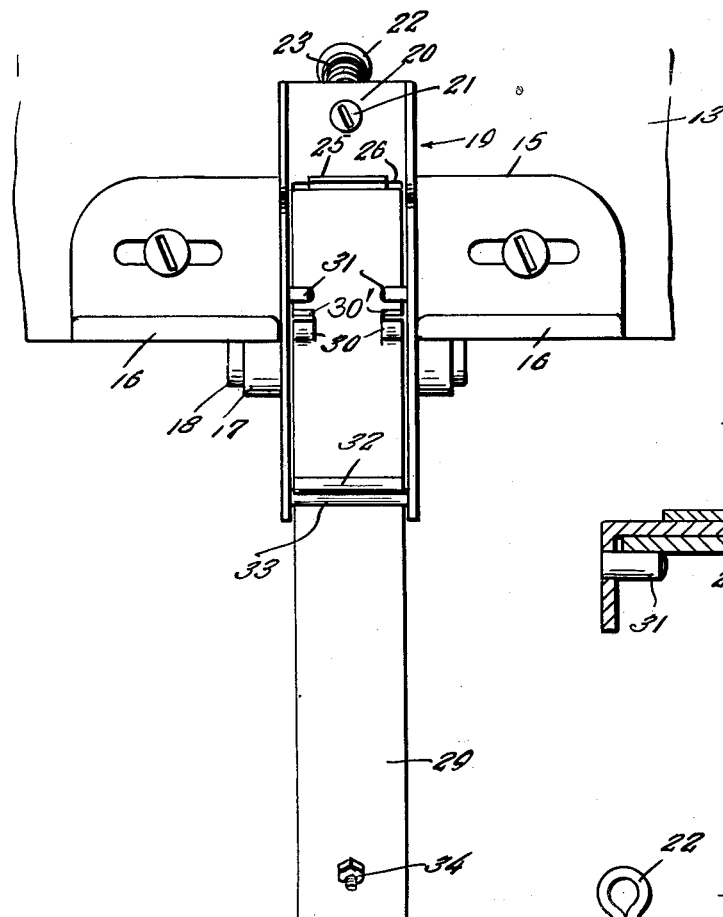
Figure 3 is a rear end elevation of the attachment seen in Figure 1 observing said figure in a direction from left to right.

The portion of the blade located between the side flanges and the carrier 19 has opposite side edge portions thereof struck outwardly to provide fingers 30 and notches 30'. The notches 30' accommodate the pins 31 projecting inwardly from the side flanges of the carrier 19 to permit the blade to rotate relative to the carrier when the blade is free of engagement with the projection 25 of the latch 24. In this connection and as shown in Figure 3, it will be noted that when the blade 29 has one end edge thereof engaged with the projection 25 of the latch a transverse rib 32 provided on the blade engages behind the cross bar 33 thus securely locking the blade against casual longitudinal movement relative to the carrier 19. A bolt 34 of suitable length is provided on the free end of the blade 29 to prevent total passage of the blade between the cross bar 33 and the adjacent end edge of the bottom or web of the carrier 19 when the blade 29 is swung to the dotted line position shown in Figure 1.

In practice, the attaching bracket 14 is secured adjustably to the fender at a point within the vicinity of the lugged tread of the tractor wheel as shown in the drawings. The rocking pin or tube 18 of the carrier is rockably mounted in the bearing 17 and the upper end thereof is bolted to the retaining element 22, thereby providing a rockable shock absorbing mounting of the carrier or adapter on the bracket.

In applying the blade 29 to the carrier 19 the end of the blade remote from the bolt 24 is passed inwardly of the carrier 19 beneath the cross bar 33 and moved longitudinally of the carrier to engage with the projection 25 of the latch member to retract the latch and bring the notches 30 in alinement with the pins 31. Next the blade is then pulled forwardly to the position shown in Figure 3, the pins 31 passing through the notches 30' to engage the top side of the blade while the inner end of the blade is engaged with the projection 25 of the latch which brings it to position behind the blade as the blade is moved to the position shown in Figure 3. When in said position the rib 32 of the blade engages behind the cross bar 33 which together with the end 25 of the latch locks the blade against casual displacement.

When the blade is thus properly arranged in the carrier the free end or scraping edge of the blade is yieldably held in contact with the rim of the wheel in the manner shown in Figure 2 under action of the spring 23.

Viewing the structure from Figure 2, and being mindful that the wheel 10 is rotating in a clockwise direction it will be apparent that with the scraping edge of the blade engaging the rim of the wheel, mud or other accumulations will be scraped from the rim. With the parts in the full line position shown in Figure 2 it will be readily seen that if a stick, stone or the like becomes caught or so wedged between the lugs of the wheel that the scraping blade cannot remove the same from the wheel the scraping blade will be forced upwardly, the force on the blade 29 being sufficient to have the blade act against the projection 25 and spring 28 of the latch 24 to cause the latch to move outwardly against the action of the spring 28 permitting the blade to move upwardly or inwardly with respect to the carriage 19. As the blade moves in this manner relative to the carriage the fingers 30 will engage the pins 31 which will act to direct the blade away from the carriage so that as the blade moves past the center it will be caused to swing in the arc of a circle finally assuming the position suggested by broken lines in Figure 2, where through the medium of the bolt 34 and the cross bar 33, it will be suspended from the carrier and prevented from becoming wholly detached therefrom.

The gist of the invention, it will be understood, is in the provision of the rockably mounted yieldable or spring-pressed adapter which serves as a retainer and guide for the blade, the blade being slidably and rockably mounted in the guide between the confining flanges and held normally in a projected scraping position by a spring-pressed latch, together with the automatically operable trip means which allows the blade to swing through a limited arc of a circle to a retracted out-of-the-way position when encountering obstinate obstructions to prevent injury and breakage to the parts of the structure.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. In a structure of the class described, an attaching bracket of angular cross sectional shape including a slotted attaching flange for adjustable connection to a fender together with a pair of spaced supporting flanges, said supporting flanges being provided with bearings, a channel-shaped guide and carrier provided intermediate its ends with a pintle pin rockably mounted in said bearings, a bolt attached to the upper end of the carrier and slidably connected at its opposite end with a retaining element on said bracket, a coil spring surrounding the bolt interposed between the retaining element and carrier for cushioning the carrier, the web portion of said carrier being formed with an opening, a spring pressed latch including a laterally directed end portion projectible through said opening, the lower end portion of said carrier being provided with a cross pin, an elongated strip of metal constituting a scraping blade having a rib on its intermediate portion engageable with said cross pin and having its upper end portion releasably engageable with said latch and its lower end portion arranged for co-operation with the tread of a wheel.

2. In a structure of the class described, an attaching bracket of angular cross sectional shape including a slotted attaching flange for adjustable connection to a fender together with a pair of spaced supporting flanges, said supporting flanges being provided with bearings, a channel-shaped guide and carrier provided intermediate its ends with a pintle pin rockably mounted in said bearings, a bolt attached to the upper end of the carrier and slidably connected at its opposite end with a retaining element on said bracket, a coil spring surrounding the bolt interposed between the retaining element and carrier for cushioning the carrier, the web portion of said carrier being formed with an opening, a spring pressed latch including a laterally directed end portion projectible through the opening, the lower end portion of said carrier being provided with a cross pin, an elongated strip of metal constituting a scraping blade and having a rib on its intermediate portion engageable with said cross pin and having its upper end portion releasably engageable with said latch and its lower end portion arranged for cooperation with the tread of a wheel, and said lower end portion being provided with a headed bolt for preventing total displacement of the blade from the carrier when the blade is kicked to a retracted out-of-the-way position.

3. A wheel scraping and cleaning device of the class described comprising an attaching bracket including an attaching flange and bearings, a longitudinal elongated guide and carrier provided intermediate its ends with a pintle pin journalled for oscillation in said bearings, a retaining element carried by said bracket, a bolt attached to the upper end of said carrier and having its opposite end slidable through said retaining element, a coil spring surrounding the bolt and interposed between the retaining element and carrier, the web portion of the carrier at a point below said bolt being formed with an aperture, a spring-pressed latch attached to said web portion and having a laterally directed end portion projectible through said aperture, the lower end of the flanges of said carrier being provided with a cross pin, an elongated metal strip constituting a scraping blade, the upper end portion thereof being normally confined between the side flanges of the carrier, the intermediate portion thereof being provided adjacent said cross pin with an abutment engageable with the cross pin, the upper end portion of the blade being engageable with the laterally directed end portion of the latch, opposed pins carried by the side flanges of the carrier, the adjacent portion of said blade being struck out to provide cam fingers engageable with said stop pins under predetermined conditions, and the lower end portion of said blade being provided with a headed retaining bolt operable in the manner described.

ROY NICEWANDER.
VICTOR C. PETERSON.